455-612 AU 233 EX
FIP8106 XR 2,833,936
- Ion discharges
May 6, 1958 T. I. RESS 2,833,936
ELECTROOPTICAL SHIFT REGISTER SYSTEM
Filed Jan. 4, 1956
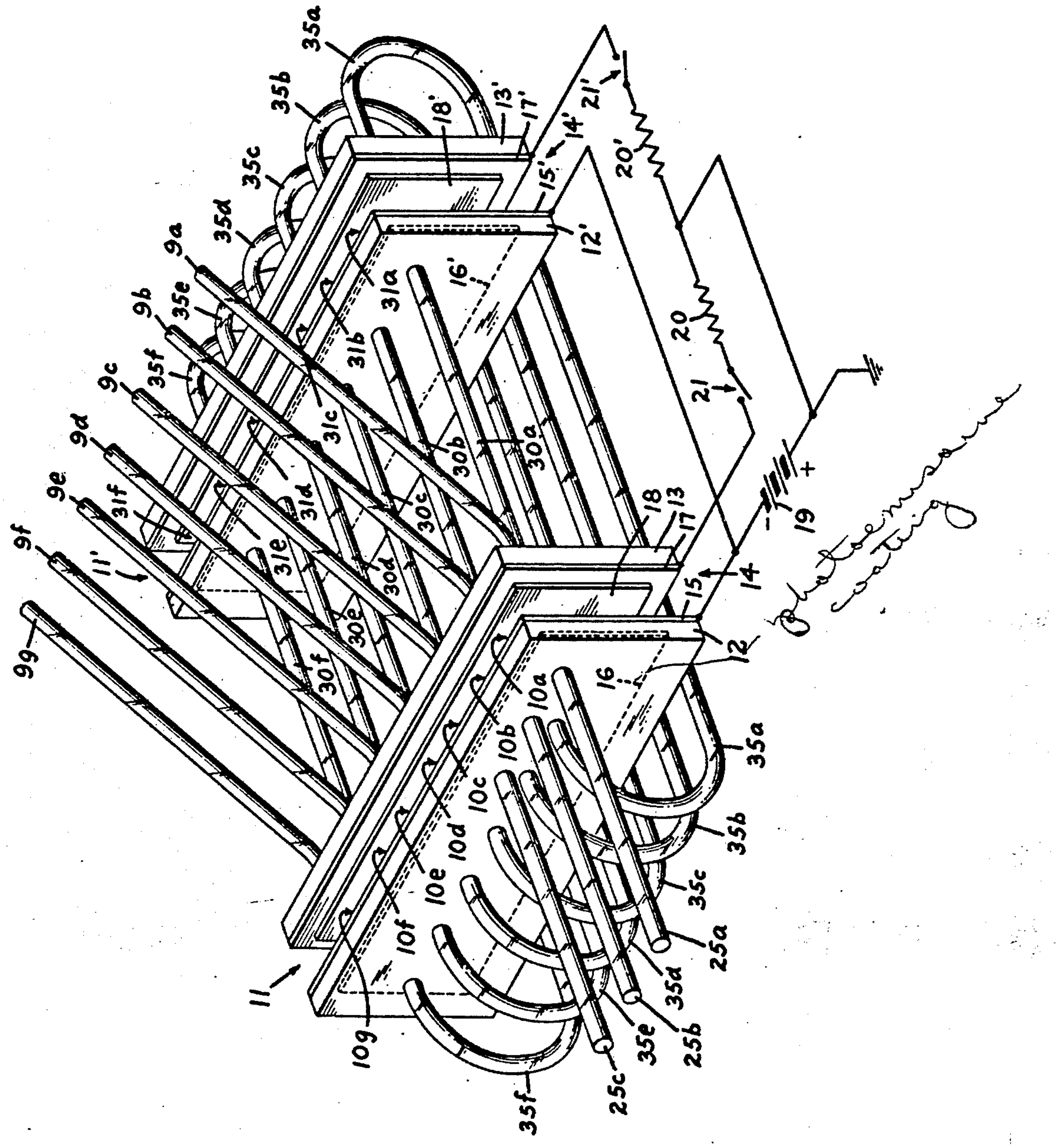
INVENTOR
THOMAS I. RESS
BY Campbell, Brumbaugh, Free and Graves
HIS ATTORNEYS 2,833,936
Patented May 6, 1958

2,833,936

ELECTROOPTICAL SHIFT REGISTER SYSTEM

Thomas I. Ress, Poughkeepsie, N. Y., assignor to International Business Machines Corporation, New York, N. Y., a corporation of New York Application January 4, 1956, Serial No. 557,377

6 Claims. (Cl. 250—208)

This invention relates generally to a shift register system, and more particularly to a system of this sort which includes electrooptical components.

It is an object of this invention to perform shift register operations on radiant energy indications representing binary data.

It is another object of the invention to amplify these radiant energy indications in the course of performing shift register operations thereon.

These and other objects are realized according to the invention by providing at least two reigster means of which each is in the form of a light amplifier means which, when energized, is responsive to a radiant energy pulse to change from a dark to a radiant energy emitting state. There is also provided a shift means which, likewise, is in the form of light energy means which, when energized, is responsive to a radiant energy pulse to change from a dark to a radiant energy emitting state. An input radiant energy duct is coupled to a first of the two register means to transmit radiant energy pulses thereto, a register-to-shift radiant energy duct is coupled between the first register means and the shift means to transmit radiant energy emission from the former as a radiant energy pulse to the latter, and a shift-to-register radiant energy duct is coupled between the shift means and the second of the register means to transmit radiant energy emission from the former as a radiant energy pulse to the latter. Also provided is a means to energize the two register means during two successive periods, and to energize the shift means during a period which extends between and overlaps the periods of energization of the register means.

The first register means during the first energization period stores and amplifies a radiant energy pulse received from the input radiant energy duct. Shortly before the end of this first period the shift means is energized to store and amplify as a radiant energy indication the radiant energy emission transferred from the first register means. Shortly before the shift means is deenergized, the two register means are again energized to cause the second register means to store and amplify the radiant energy indication transferred from the shift means. The net result of the described shift register operations is thus to transfer a radiant energy indication representing a binary digit from the first register means to the second register means.

As a feature according to the invention, more than two register means may be provided, and more than one shift means may be provided, in each instance there being one less shift means than there are register means. As another feature according to the invention, there may be provided a plurality of input radiant energy ducts to supply to the binary shift register system a corresponding plurality of radiant energy pulses collectively representing a multi-digit binary member. As yet another feature according to the invention, the number of input radiant energy ducts may be half or less than half the number of register means in order to give the system sufficient digit storage capacity in relation to the number of input ducts to permit the whole of any binary digit number initially stored by the system to be advanced by successive shifting actions beyond the input ducts to thereby clear the system for reception of a new binary number while still storing the previously received binary number.

For a better understanding of the invention, reference is made to the following description of an exemplary embodiment thereof, the description to be taken with the accompanying figure which represents a three-dimensional view of the exemplary embodiment.

A convention used in the following description is that counterpart elements are designated by the same numerical designations, but are distinguished by utilizing different suffixes for these numerical designations. It will be understood, accordingly, that, unless the context otherwise requires, any description of an element with a certain numerical designation and suffix shall be taken to apply also to any other element with the same numerical designation but with a different suffix.

Referring to the figure, the numbers *9a*–*9g* designate a plurality of output light ducts of, say, methylcryalate resin, for a corresponding plurality of register means 10*a*–10*g*. Each of these register means is a separate section of an ionization chamber 11 of the type disclosed by Kurt S. Lion in his article "Electronic Photography" in the December 1953 issue of Research Reviews. As set forth in this article, the chamber 11 may be comprised of a pair of plates 12, 13 which are each transparent to "radiation" by which is meant herein electromagnetic radiation lying within the infrared, visible light, or ultraviolet ranges of the electromagnetic spectrum. The plates 12, 13 are spaced apart to enclose therebetween a heavy ionizable medium 14.

The first plate 12 has deposited on the inner wall thereof a coating 15 of transparent electroconductive material such as is used for the electroconductive transparent coatings on the inner walls of the screen faces of cathode ray tubes used in television receivers. Deposited in turn on the transparent electroconductive coating is a very thin coating 16 of material adapted to emit exoelectrons when excited by radiant energy. This coating 16 is so thin as to be at least partially transparent to radiation transmitted through plate 12 in order that this radiation may reach the front face of coating to produce emission of electrons therefrom into the medium 14. The coating 16 may thus be a layer of tungsten or gold of a thickness of from 30 to 60 Angstrom units.

The second plate 13 has deposited on the inner wall an electroconductive transparent coating 17 similar to the already described coating of like nature on plate 12. This coating on plate 13 is overlain by coating 18 which is composed of phosphor material, and which is similar to the phosphor coatings used in cathode ray tubes.

A voltage source 19 has its negative terminal connected to the coating 16 through the electroconductive coating 15 of plate 12, and its positive terminal connectable through a current limiting resistor 20, a switch 21 and the electroconductive coating 17 of plate 13 to the phosphor coating 18. When voltage from source 19 is applied between coating 16 and the phosphor coating 18 by closing switch 21, the chamber 11 is adapted to sustain local ion discharges (as later more fully described). These local ion discharges excite into luminescence the areas of the coating 18 which lie in the respective paths of the discharges to cause these areas to emit radiant energy through plate 13. The output ducts 10*a*–10*g* are coupled in radiation receiving relation to the coating 18 to each provide for read out of the radiant energy emission developed by one these areas in the presence of a localized ion discharge.

The local ion discharges are initially produced within chamber 11 by radiant energy pulses transmitted to the chamber through a plurality of input ducts 25*a*–25*c* which are longitudinally spaced opposite the output ducts 9*a*–9*c*. The input ducts 25*a*–25*c* are coupled to transmit the input radiant energy pulses to the coating 16 to thereby produce emission into the ionizable medium of electrons from this coating in the areas thereof directly in front of the near ends of the ducts 25*a*–25*c*. Each localized electron emission of this sort will produce a localized ion discharge in chamber 11 whenever the two electrodes of the chamber provided by coatings 16 and 18 have a voltage of ionizing value impressed thereacross.

From what has been said, it will be seen that the sections 10*a*–10*c* of ionization chamber 11 which respectively lie between input ducts 25*a*–25*c* and output ducts 9*a*–9*c* represent a plurality of register means wherein respective radiant energy input pulses to the several register means are registered by stored radiant energy indications developed by sustained localized ion discharges. Each such register means is in the nature of a light amplifier means inasmuch as the radiant energy emission developed therein by a localized area of phosphor electrode 18 in the presence of an ion discharge is substantially greater in energy content than the radiant energy pulse which initiates the ion discharge. Moreover, each such register means is in the nature of an ion discharge cell inasmuch as each such register means represents a separate unit of ion discharge activity within the chamber 11. The other register means 10*d*–10*g* are similar in nature to the already described register means 10*a*–10*c*.

To provide for a shifting action, the embodiment shown in the figure includes a second ionization chamber 11′ which is essentialy similar in structure to chamber 11, and which, hence, need not be described in detail. Coupled between the chambers 11 and 11′ are a plurality of register-to-shift radiant energy ducts 30*a*–30*f* which are composed of, say, methylcryalate resin. The first of these ducts, i. e. the duct 30*a*, is coupled to chamber 11 to receive radiation from the first section 10*a* of chamber 11, and the succeeding register-to-shift ducts 30*b*–30*f* are coupled to the chamber 11 to similarly receive radiation from, respectively, the sections 10*b*–10*f* of chamber 11. There is no register-to-shift duct corresponding to the last section 10*g* of chamber 11, since such register-to-shift duct would be superfluous. At the other ends thereof, the ducts 30*a*–30*f* are coupled to chamber 11′ to transmit the radiant energy emission developed by the sections 10*a*–10*f* of chamber 11 as radiant energy pulses to the electron missive coating 16′ of chamber 11′. The radiant energy pulses transmitted by ducts 30*a*–30*f* will produce localized ion discharges in chamber 11′ in the same manner as localized ion discharges are produced in chamber 11 responsive to radiant energy pulses supplied thereto. Thus, in a manner analogous to that already described for chamber 11, the ducts 30*a*–30*f* serve to subdivide the chamber 11′ into a corresponding plurality of sections 31*a*–31*f* in each of which an independent localized ion discharge takes place. Each such section, which will be designated hereinafter as a shift means, is in the nature of a light amplifier means inasmuch as the localized area therein of phosphor electrode 18′ is adapted, when excited by an ion discharge, to produce a radiant energy emission which is greater in energy content than the transmitted radiant energy pulse which initiates the ion discharge. Moreover, each such section is in the nature of an ion discharge cell inasmuch as each such section is a separate unit of ion discharge activity within the chamber 11′.

The respective radiation outputs of the several sections 31*a*–31*f* of chamber 11′ are fed back to the chamber 11 by a plurality of shift-to-register radiant energy ducts 35*a*–35*f*. Of these ducts, the first duct 35*a* receives the radiant energy developed by section 31*a*, and transmits this radiant energy to the localized area of exo-electron emissive coating 16 which is in section 10*b* in chamber 11. Similarly, the shift-to-register duct 35*b* transmits radiant energy from the section 10*b* in chamber 11′ to the section 10*c* in chamber 11, and in like manner each other shift-to-register duct transmits radiant energy from a given section in chamber 11′ to the next advanced section in chamber 11. It will be noted that the only radiation inputs received by the sections 10*d*–10*g* in chamber 11 are the respective radiation inputs provided by the shift-to-register ducts 35*c*–35*f*.

The mode of operation of the described shift register system is as follows. Assume that initially both of the switches 21 and 21′ are open to thereby render both of chambers 11 and 11′ de-energized and thus deionized. As a first step, the switch 21 is closed to energize chamber 11 with an ionizing voltage. As a second step, a binary number having three digit positions corresponding to the three input ducts 25*a*, 25*b*, 25*c* is read into the chamber 11 by transmitting radiant energy pulses representing the binary digit "1" through such of the one or more input ducts as are associated with a digit position occupied by a binary digit "1" in the binary number, and by not transmitting any radiant energy pulses through the one or more remaining ducts to thereby read in the binary digit "0" for the one or more digit positions of the binary number associated with these remaining ducts. The described transmission of radiant energy pulses through a selected one or ones of the input ducts 25*a*–25*c* causes localized ion discharges in the one or more sections 10*a*–10*c* of chamber 11 which are opposite the one or more input ducts which are pulse transmitting. These localized ion discharges in turn cause corresponding localized areas of phosphor electrode 18 to luminesce to thereby provide from each such area a radiant energy emission which is greater in energy content than the radiant energy pulse which initiated the ion discharge. The radiant energy emissions from the one or more selected localized areas of phosphor electrode 18 represent the original binary number as stored and as amplified in the chamber 11. It will be evident that this amplified form of the binary number may be immediately read out of chamber 11 through the output ducts 9*a*–9*c*.

As a third step, while switch 21 still remains closed, the switch 21′ is closed to energize chamber 11′ with an ionizing voltage. The one or more radiant energy emissions received by chamber 11′ from chamber 11 via one or more of ducts 30*a*–30*c* thus produce corresponding localized ion discharges within one or more of the sections 31*a*–31*c* of chamber 11′. It follows that the closing of switch 21′ produces a transfer of the binary number registered by chamber 11 to the chamber 11′. The chamber 11′ stores and amplifies this binary number in the same way as the number is stored and amplified in chamber 11.

As a fourth step, shortly after switch 21′ has been closed, the switch 21 is opened to de-energize chamber 11 to thereby suppress the localized ion discharges therein. The chamber 11 is thus cleared of the binary number which was originally registered thereby, and which is now stored in chamber 11′. As a fifth step, with switch 21′ still remaining closed, the switch 21 is again closed to re-energize chamber 11 with an ionizing voltage. Under these circumstances, the one or more radiant energy emissions received by chamber 11 from chamber 11′ via one or more of ducts 35*a*–35*c* produce corresponding localized ion discharges in one or more of the sections 10*b*–10*d* of chamber 11. It follows that the binary number which is now being stored in chamber 11′ will be transferred to the chamber 11 to be registered thereby, and that this new registration of the binary number will be advanced by one section in chamber 11 from the initial position of registration of the binary number in the chamber. In other words, the binary number which was originally registered by sections $10a$–$10c$ has now been shifted to be registered by the setcions $10b$–$10d$.

From what has been said, it will be seen that if the chamber 11 is periodically energized by closing and then opening switch 21, and if the chamber 11' is also periodically energized by closing and opening switch 21' in a time sequence wherein the periods of energization of chambers 11 and 11' overlap one another, the binary number initially registered by chamber 11 will be transferred back and forth between chambers 11 and 11' so that registration of the binary number will undergo a section-by-section forward shift in chamber 11. Inasmuch as the binary number adapted to be registered by chamber 11 has only three digit positions (in correspondence with the three input ducts $25a$–$25c$), and inasmuch as there are seven sections in chamber 11 by which the binary number may be registered, the shifting in chamber 11 of the binary number can be continued until the registration of the number in chamber 11 is entirely clear of the sections $10a$–$10c$ which initially registered the number. This full clearance can be obtained whenever the number of input ducts is half or less than half the number of registering sections in chamber 11. Of course, for any position of registration in chamber 11, the binary number can be read out of the chamber by utilizing appropriate ones of the output ducts $9a$–$9g$.

The above-described embodiment being exemplary only, it will be understood that the invention herein comprehends embodiments differing in form or detail from the above-described embodiment. For example, the overlapping successive periods of energization of the chambers 11 and 11' need not be obtained by the manually operated switches 21, 21', but may instead be obtained by an automatic switching circuit which is actuated by signals from a programming unit in, say, a computer so that the binary number registered by chamber 11 is shifted one or more digit positions within this chamber whenever the programming unit calls for such shift of one or more positions. Accordingly, the invention is not to be considered as limited save as is consonant with the scope of the following claims.

I claim:

1. Apparatus comprising, a plurality of at least two register means, each register means being in the form of a light amplifier means which, when energized, is responsive to a radiant energy pulse to change from a dark to a radiant energy emitting state, an input radiant energy duct coupled to a first of said two register means to transmit radiant energy pulses thereto, a shift means in the form of light amplifier means which, when energized, is responsive to a radiant energy pulse to change from a dark to a radiant energy emitting state, a register-to-shift radiant energy duct coupled between said first register means and said shift means to transmit radiant energy emission from the former as a radiant energy pulse to the latter, a shift-to-register radiant energy duct coupled between said shift means and the second of said register means to transmit radiant energy emission from the former as a radiant energy pulse to the latter, and means to energize said plurality of register means during two successive periods and to energize said shift means during a period which extends between and overlaps the periods of energization of said register means.

2. Apparatus comprising, a plurality of register means including a first and a last of such means, each register means being in the form of a light amplifier means which, when energized, is responsive to a radiant energy pulse to change from a dark to a radiant energy emitting state, at least one input radiant energy duct coupled to the first of said register means to transmit radiant energy pulses thereto, a plurality of shift means respectively corresponding to all except the last of said register means, each shift means being in the form of a light amplifier means which, when energized, is responsive to a radiant energy pulse to change from a dark to a radiant energy emitting state, a plurality of register-to-shift radiant energy ducts each coupled between one of said shift means and the corresponding register means to transmit radiant energy emission from the latter as a radiant energy pulse to the former, a plurality of shift-to-register radiant energy ducts each coupled between one of said shift means and the next advanced register means to transmit the radiant energy emission of the former as a radiant energy pulse to the latter, and means to periodically energize said plurality of register means, and said plurality of shift means in a time sequence producing overlaps with one another of the energization periods of said register means and the energization periods of said shift means.

3. Apparatus comprising, a plurality of register means including a first and a last of such means, each register means being in the form of a light amplifier means which, when energized, is responsive to a radiant energy pulse to change from a dark to a radiant energy emitting state, a plurality of radiant energy input ducts at least one less in number than said plurality of register means, said input ducts being respectively coupled to the first and successive ones thereafter of said register means to transmit radiant energy pulses thereto, a plurality of shift means respectively corresponding to all except the last of said register means, each shift means being in the form of a light amplifier means which, when energized, is responsive to a radiant energy pulse to change from a dark to a radiant energy emitting state, a plurality of register-to-shift radiant energy ducts each coupled between one of said shift means and the corresponding register means to transmit radiant energy emission from the latter as a radiant energy pulse to the former, a plurality of shift-to-register radiant energy ducts each coupled between one of said shift means and the next advanced register means to transmit the radiant energy emission of the former as a radiant energy pulse to the latter, and means to periodically energize said plurality of register means, and said plurality of shift means in a time sequence producing overlaps with one another of the energization periods of said register means and the energization periods of said shift means.

4. Apparatus comprising, a plurality of at least two register cells, each register cell being in the form of an ionization cell which, when energized by an ionizing voltage, is responsive to a radiant energy pulse to develop and sustain an ion discharge therein, a luminescent ion target in each shift cell, each such target being adapted to emit radiant energy from its cell when excited by an ion discharge therein, an input radiant energy duct coupled to the first of said two register cells to transmit radiant energy pulses thereto, at least one shift cell in the form of an ionization cell which, when energized by an ionizing voltage, is responsive to a radiant energy pulse to develop and sustain an ion discharge therein, a luminescent ion target in said shift cell adapted to emit radiant energy therefrom when excited by an ion discharge therein, a register-to-shift radiant energy duct coupled between the said first register cell and said shift cell to transmit radiant energy from the former as a radiant energy pulse to th latter, a shift-to-register radiant energy duct coupled between said shift cell and the second of said register cells to transmit radiant energy emission from the former to the latter, and means to energize said plurality of register cells with ionizing voltage during two successive periods, and to energize said shift cell with ionizing voltage during a period which extends between and overlaps the periods of energization with ionizing voltage of said register means.

5. Apparatus comprising, a plurality of register cells including a first and a last of said cells, each register cell being in the form of an ionization cell which, when energized with an ionizing voltage, is responsive to a radiant energy pulse to develop and sustain an ion discharge, a luminescent ion target in each register cell, each target being adapted to emit radiant energy from its cell when excited by an ion discharge therein, at least one input radiant energy duct coupled to the first of said register cells to transmit radiant energy pulses thereto, a plurality of shift cells respectively corresponding to all except the last of said register cells, each shift cell being in the form of an ionization cell which, when energized with an ionizing voltage, is responsive to a radiant energy pulse to develop and sustain an ion discharge, a luminescent ion target in each shift cell, each last-named target being adapted to emit radiant energy from its cell when excited by an ion discharge therein, a plurality of register-to-shift radiant energy ducts each coupled between one of said shift cells and the corresponding register cell to transmit radiant energy emission from the latter as a radiant energy pulse to the former, a plurality of shift-to-register radiant energy ducts each coupled between one of said shift cells and the next advanced register cell to transmit the radiant energy emission of the former as a radiant energy pulse to the latter, and means to periodically energize with ionizing voltage said plurality of register cells and said plurality of said shift cells in a time sequence producing overlaps with one another of the energization periods of said register cells and the energization periods of said shift cells.

6. Apparatus comprising, a plurality of register cells including a first and a last of said cells, each register cell being in the form of an ionization cell which, when energized with an ionizing voltage, is responsive to a radiant energy pulse to develop and sustain an ion discharge, a luminescent ion target in each register cell, each target being adapted to emit radiant energy from its cell when excited by an ion discharge therein, a plurality of radiant energy input ducts at least one less in number than said plurality of register cells, said input ducts being respectively coupled to the first and successive ones thereafter of said register cells to transmit radiant energy pulses thereto, a plurality of shift cells respectively corresponding to all except the last of said register cells, each shift cell being in the form of an ionization cell which, when energized with an ionizing voltage, is responsive to a radiant energy pulse to develop and sustain an ion discharge, a luminescent ion target in each shift cell, each last-named target being adapted to emit radiant energy from its cell when excited by an ion discharge therein, a plurality of register-to-shift radiant energy ducts each coupled between one of said shift cells and the corresponding register cell to transmit radiant energy emission from the latter as a radiant energy pulse to the former, a plurality of shift-to-register radiant energy ducts each coupled between one of said shift cells and the next advanced register cell to transmit radiant energy emission of the former as a radiant energy pulse to the latter, and means to periodically energize said plurality of register cells and said plurality of said shift cells in a time sequence producing overlaps with one another of the energization periods of said register cells and the energization periods of said shift cells.

References Cited in the file of this patent

Loebner: "Opto-Electronic Devices and Networks," Proc. of the Inst. of Radio Engineers, December 1955, pp. 1905 and 1906.

Eckert: "A Survey of Digital Computer Memory Systems," Proc. of the Inst. of Radio Engineers, October 1953, p. 1404.

Mellon Institute of Industrial Research, Quarterly Report #3 of the Computer Components Fellowship #347, pages vi–9.